United States Patent [19]
Ferguson

[11] 3,749,439
[45] July 31, 1973

[54] DEVICE FOR RAISING AND LOWERING THE TOPS OF CONVERTIBLE RECREATIONAL VEHICLES

[75] Inventor: Robert E. Ferguson, Middlebury, Ind.

[73] Assignee: Coachmen Industries, Inc., Middlebury, Ind.

[22] Filed: June 21, 1971

[21] Appl. No.: 154,743

[52] U.S. Cl. .................................. 296/26, 52/108
[51] Int. Cl. ............................................ B60p 3/34
[58] Field of Search ................. 296/23 R, 23 C, 26, 296/27; 52/108, 111, 66

[56] References Cited
UNITED STATES PATENTS

| 3,273,934 | 9/1966 | Hagenson | 296/26 |
| 2,574,657 | 11/1951 | Pierce | 296/23 C |
| 3,495,866 | 2/1970 | Bontrager | 296/27 |
| 3,349,526 | 10/1967 | Schuster | 52/108 |

Primary Examiner—Philip Goodman
Attorney—John A. Young

[57] ABSTRACT

A lifting mechanism for the tops of recreational vehicles, such as campers and the like, consists of two pairs of adjustable telescoping members connected to the four corners of the top. Tracks, having horizontal and vertical sections with interconnecting radius sections, have lifting elements slidably received in the tracks and are mechanically moved within the tracks to exert expanding movement on the telescoping elements and therefore lifting movement on the top. The elements consist of plastic or other composition members which are connected in series to each other by flexible connections which permit them to turn through a radius from horizontal to vertical track sections, and also transmit along their length the lifting force exerted manually at one part of the system. Thereby lifting force is communicated evenly to each of the four corners of the top while it is being raised and lowered. There is no possibility for jamming or misalignment and the product is easily constructed and maintained.

6 Claims, 9 Drawing Figures

INVENTOR
ROBERT E. FERGUSON
by John A. Young
Attorney

INVENTOR
ROBERT E. FERGUSON
by John A. Young
Attorney 3,749,439

DEVICE FOR RAISING AND LOWERING THE TOPS OF CONVERTIBLE RECREATIONAL VEHICLES

BACKGROUND OF THE INVENTION

Recreational vehicles such as tent trailers have a raisable and lowerable top. During use, the top is raised, the ends are pulled out, and there is provided substantial head room and comfortable living quarters including sleeping and cooking facilities. During transportation, the ends are retracted and the top lowered so the unit can more easily be transported with minimal effort and clear rear vision. Many devices have been proposed for the raising and lowering of the tops of the recreational vehicle, and almost all of these devices are mechanically operated and effect their respective results by a mechanical principle.

The functional requirement of these raising and lowering devices is that they be substantially foolproof and not easily broken in the field since the units are virtually non-transportable should the top be raised and cannot be lowered.

A mechanical device is needed for raising and lowering the top by communicating substantially even raising force at each of the four corners of the top, so that it will be evenly raised without creating binding forces which inhibit unimpeded raising and lowering movements of the top.

Many mechanical raising and lowering devices for tops of recreational devices are proposed; but the general difficulty, is that in meeting one of the favorable principles of centralized actuation, it is difficult to obtain equalized effort providing the raising and lowering movements of the top. The attainment of this result in an effective and efficient manner has generally evaded the art.

OBJECTS OF THE INVENTION

It is the foremost object of the present invention to provide a mechanical device for raising and lowering the tops of recreational vehicles and which will do so be effectively and evenly distributing raising force at each of the four corners of the top.

Another object of the present invention is to provide a new and improved series of lifting elements which are mechanically displaced from a central manually operative input, such elements being freely movable from a horizontal guide through a vertical guide to effect a raising force at each of distinctly different locations on the top of a recreational vehicle.

A still further object of the present invention is to provide a unique combination of specially constructed force transmitting elements which are articulated together into a chain, one chain for each of the corners of the top of the recreational vehicle and which is mechanically displaceable as a chain to move around at right angle bends and to transmit force along the length of chain from the input effort to the top of the vehicle at selected locations.

Another object of the present invention is to provide a novel articulated linkage for a series of force transmitting elements which are mechanically displaceable, can move without binding through horizontal channel means and right angle bends into vertical channel means and therein transmit displacement force to the portion of the top associated therewith. Related to this is the object that such displaceable elements may be in the form of blocks held in spaced-apart relation on flexible wires and cables, or a series of balls are strung on flexible cables or a plurality of sliding balls which are mounted and advanced on a flexible cable. In each of these cases, either the cable or the articulated linkages between successive elements permit the change of direction from vertical to horizontal directions without binding force or substantial frictional loss of force.

A still further object of the present invention is to provide an elevating means which is adjustable laterally for different size recreational vehicles so that a given actuator may be standardized for many different size vehicles.

Other objects and features of the present invention will become apparent from a consideration of the following description which proceeds with reference to the accompanying drawings.

DRAWINGS

Figure 9:
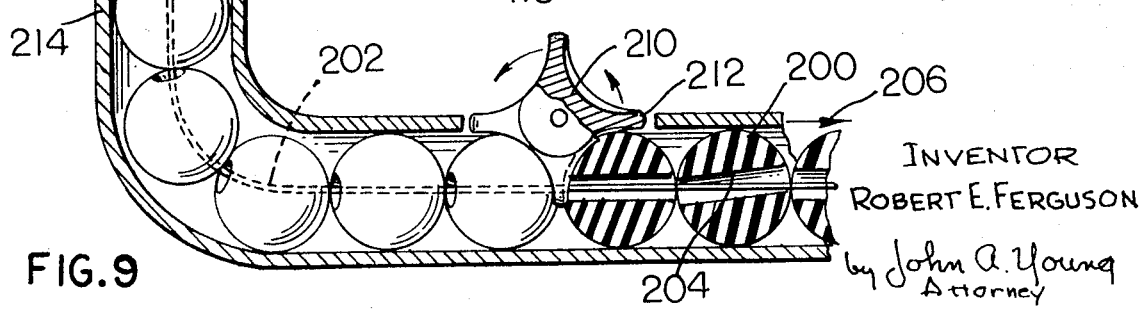
Figure 7:
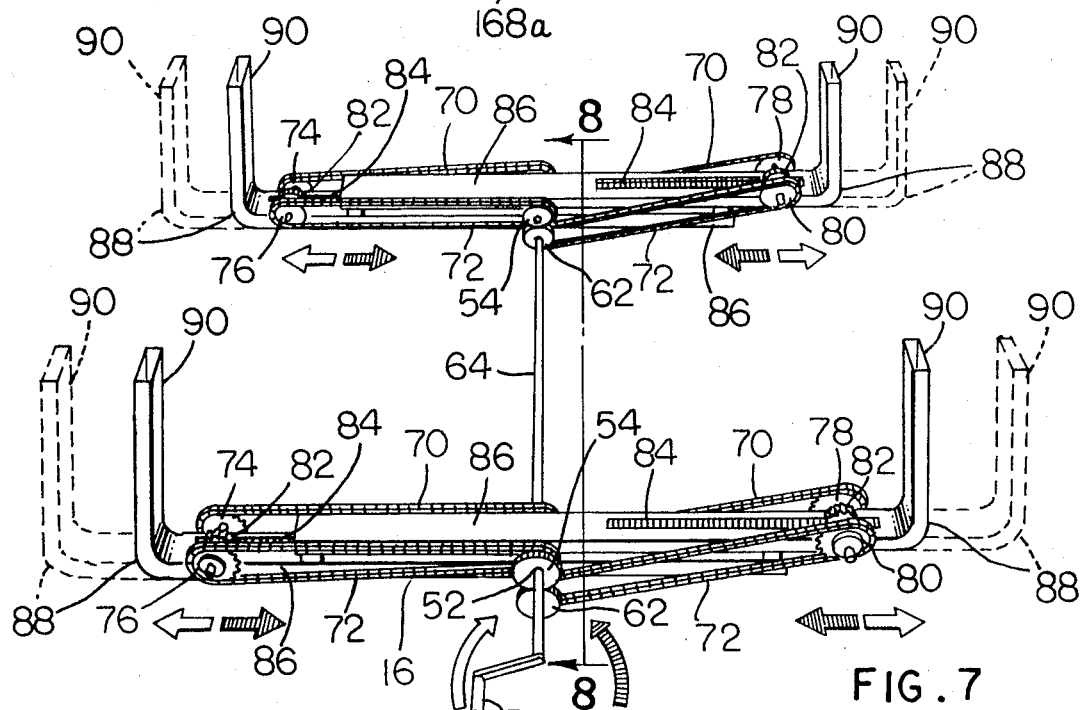
FIG. 7 is an isometric view showing the actuating system and the lateral adjustment of the tracks or conduits for receiving the flexibly movable blocks and also illustrating the mechanical drive means.
Figure 8:
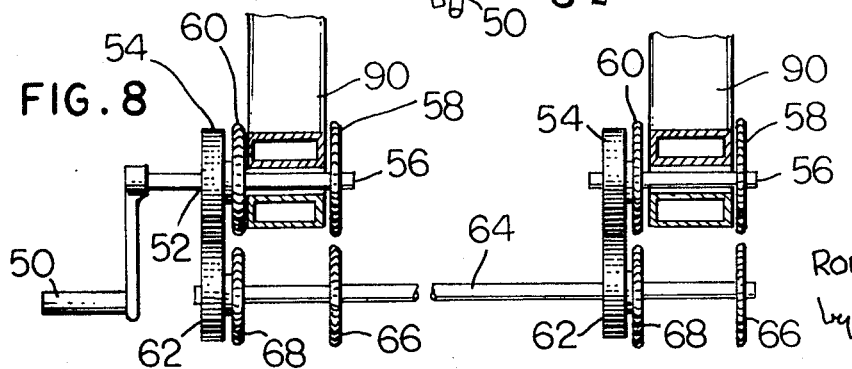

FIG. 8 illustrates in detail view a schematic form of the mechanical actuating system shown in FIG. 7; and FIG. 9 is a further embodiment of the invention in which a series of balls are slidably mounted on a guide cable which guides the balls from horizontal to vertical movement, the balls being in abutting relationships so that lifting force can be exerted to the entirety of the balls by exerting effort on the last ball in contact with the actuator.

WORKING EXAMPLES OF THE INVENTION

The invention is described in connection with a recreational vehicle designated generally by reference numeral 10 and which is oftentimes referred to as a convertible tent camper. The camper 10 consists of a frame 12 which is mounted on an axle and has ground-engaging wheels, one of which is illustrated by reference numeral 14. At the front 16 of the camper is a tow linkage 18 which connects with a vehicle and a ground-engaging pilot wheel 20.

Figure 1:
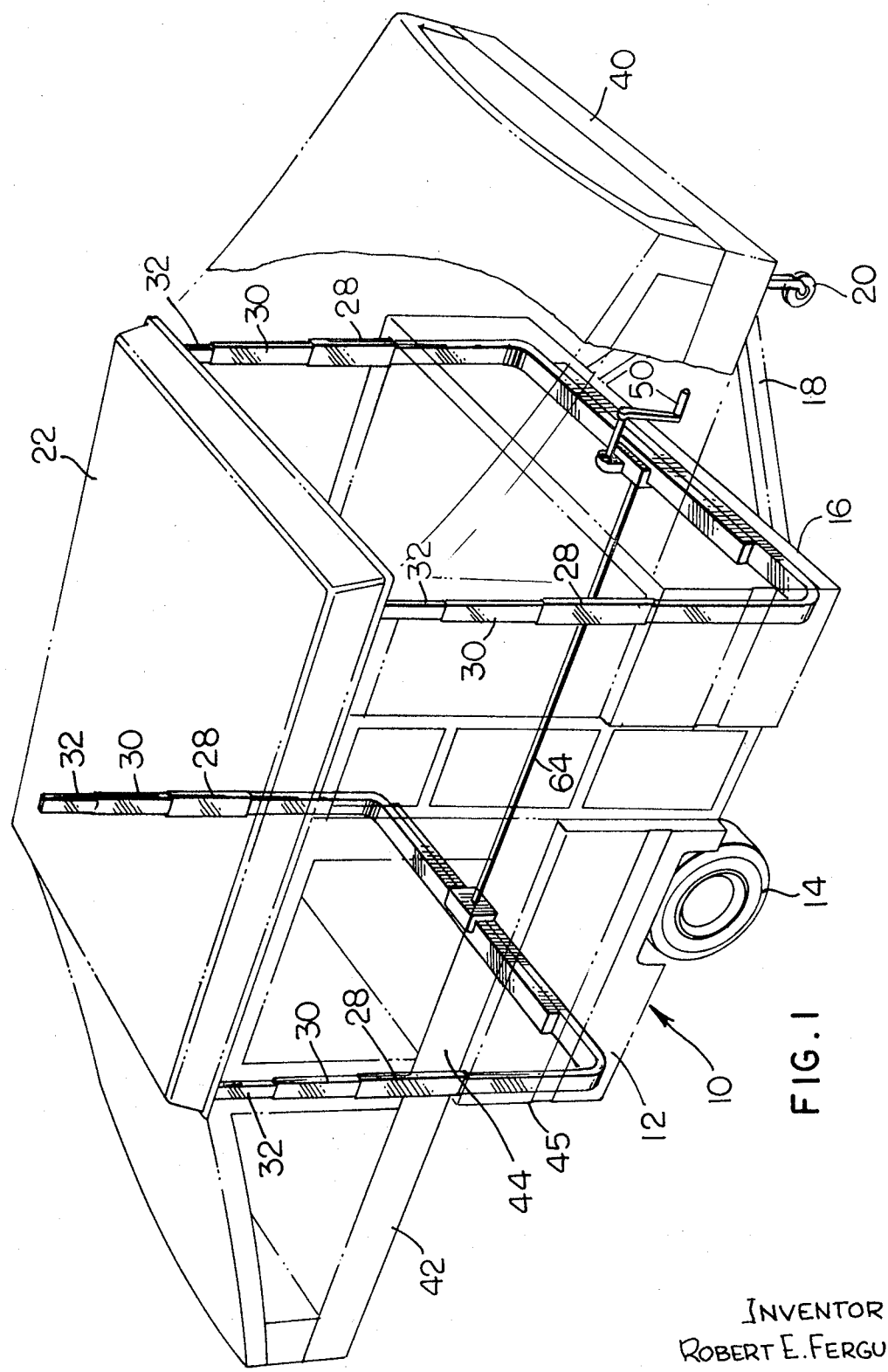
FIG. 1 is an isometric view of a frame and telescoping members in combination with the top of a recreational vehicle, the top being shown raised; the forward end of the vehicle illustrates the extended end which provides sleeping facilities and the rear of the recreational vehicle is also extended.
Figure 2:
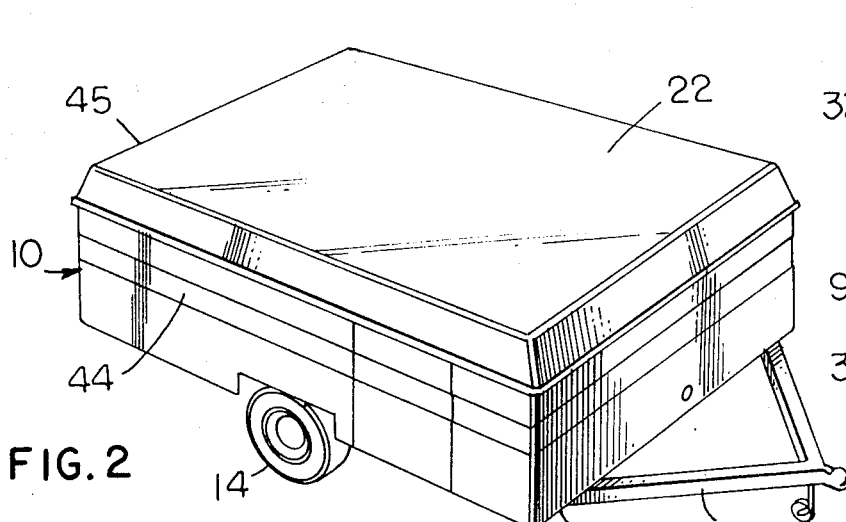
FIG. 2 illustrates the same recreational vehicle of FIG. 1 but in a fully compacted condition wherein the ends are retracted and the top lowered for transport.
Figure 4:
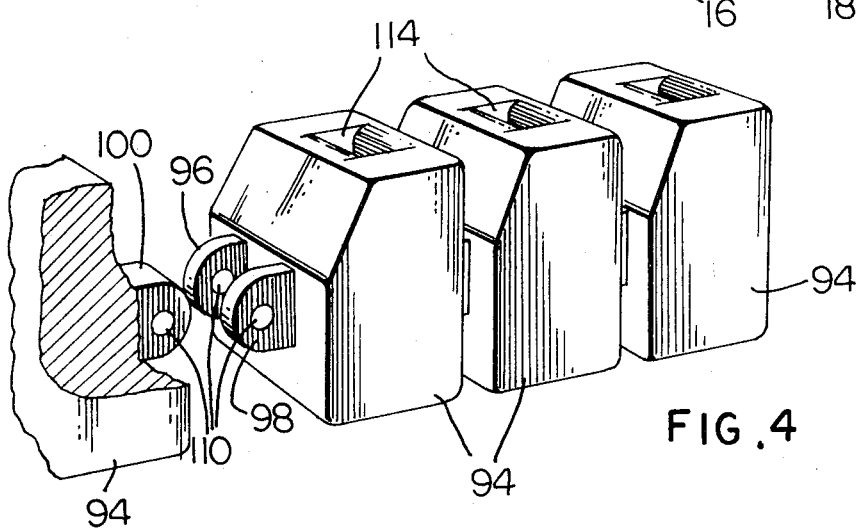
FIG. 4 is an enlarged isometric view of four of the articulately connected elements or blocks with the articulated connection separated and a portion thereof broken away.

The recreational vehicle has a top 22 which is raised by a series of telescoping members 28, 30, 32, there being a combination of such telescoping members 28, 30, 32 at each of the corners of the top 22, so that the top can be raised or lowered squarely. In FIG. 1, the top 22 is shown in a fully raised position and in FIG. 2, the top 22 is illustrated in a fully lowered position. The ends 40, 42 of the camper are proportioned to be fully retractable to within the confines of the body 44.

The top 22 is raised and lowered mechanically by means of a crank 50 which fits into an opening 52 of gear wheel 54 supported on an axle 56 to rotate the gear 54 and concurrently rotate sprocket wheels 58 and 60. A transfer gear 62 which meshes with gear 54 is mounted on through shaft 64, and will counterrotate sprockets 66 and 68.

Sprocket pairs 58, 60 and 66, 68 are counterrotated and are connected by belts 70, 72 with coating sprockets 74, 76, 78 and 80 (FIG. 7) at the front end 16 of the vehicle frame. The longitudinally extending through shaft 64 operates an identical set of gears and sprockets at the rear 45 of the vehicle. Each pair of sprockets 74, 76 and 78, 80 operates a central gear 82 which extends through an opening 84 of a horizontal track section 86, having right angle bends 88 at the ends thereof, and an integrally joined vertical track section 90.

Figure 3:
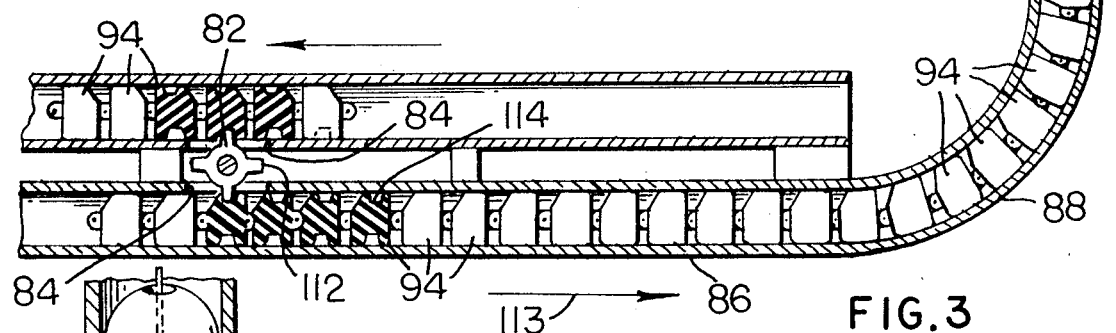
FIG. 3 illustrates one of the set of telescoping members shown partially extended and a chain of articulately connected elements for displacing the telescoping elements in the direction of movement of the elements.

Within horizontal track section 86 are a plurality of plastic blocks 94, each having articulate wrist pin lug connections 96, 98 and a coacting wrist pin lug 100 which is part of the adjacent block 94. Coaxially aligned openings 110 receive the wrist pin therein, thus enabling the adjacent blocks 94 to move slightly pivotally relatively to the adjacent blocks as indicated in FIG. 3 and enabling the blocks to move from the horizontal track section 86 in the direction of the arrow 113 around the radius or right angle bend 88 and into the vertical track section 90. Force is communicable along the entire length of the blocks. The vertical sections 90 are movable between the full line positions and the dotted line positions in FIG. 7 in order to accommodate different width of sizes of campers.

Each gear wheel 82 has a plurality of gear teeth 112, the spacing of which around the periphery of the wheel corresponds to the spacing between adjacent blocks, so that one of the teeth 112 enters recess 114 of the gear block and positively displaces the block in the upper and lower horizontal storage track sections (FIG. 3). When so operated not only the directly contacted block 94, but all of the other blocks 94 in the row or chain of blocks, will transmit raising or lowering forces on the telescoping members 28, 30, 32, and hence that corner of the top 22 connected therewith. As shown in FIG. 3, the horizontal sections are vertically overlapped so that there is a sufficient reserve of blocks enabling the entire chain of blocks to effect the necessary vertical movement for full raising of the top 22. The blocks 94 are typically made of teflon, polyethylene or other plastic material which is quite smooth and has a low coefficient of friction enabling it to be easily displaced. There is little opportunity for misalignment or nonalignment of the block and no opportunity for breakage or kinking of the chain which is made up of the respective articulated blocks. From the effort of the one crank 50 raising forces are simultaneously communicated to the respective chain of blocks at the four corners of the top.

Furthermore, there is no lost motion or substantial friction loss to cause binding and whatever mechanical advantage is desired can be provided through the crank 50 and the gear ratio between gears 54, 62, sprockets 58, 60, and intersecting sprockets 74, 76.

The elongated track opening 84 permits entry of the gear wheel 82 into the openings 114 in the chain of blocks regardless of the adjusted position of vertical sections 90, such vertical sections being adjustable between the full line position of FIG. 7 and the dotted line position to accommodate for different width vehicles.

In addition to the blocks 94 serving as a chain of force transmission, there may be used a number of spherical elements 160 (FIG. 5) which are mold fitted at spaced points onto a flexible cable or wire 162 having sparks 164 which prevent the molded spheres 160 from moving relatively to the wire 162. The balls 160 together with the wire 162 constitute the force transmitting means which moves through the horizontal track or guide section 86, around the radius 88 and upwardly through the vertical section 90 to transmit displacement force on top 22. Gear wheel 166 has a number of radially projecting pairs of fingers 168 with the spacing 170 therebetween sufficient to receive the cable 162 therein and exert effort against the end of the ball and forces its advancement; the two fingers 168 are strong enough to advance the chain of interconnected balls. The section 170 between adjacent balls is flexible enough that it will permit the necessary bending around the radius while at the same time is sufficiently stiff so that it will not buckle but will transmit longitudinal force within the vertical section 90 of the track between adjacent balls 160. It should be understood of course that the track is of close tolerance fit relatively to the diameter of the balls 160 so that the balls 160 will not permit buckling of sections 170. As previously stated, the balls are molded to the wire or cable 162 and the spikes or barbs 164 prevent relative slippage of the ball relatively to the wire 162.

Figure 6:
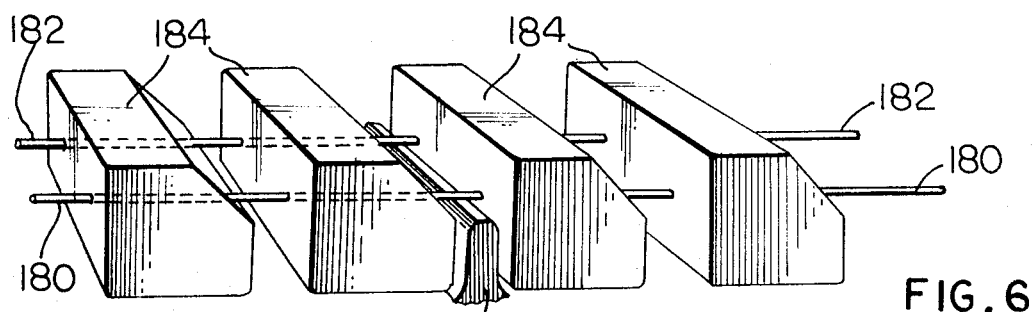
FIG. 6 illustrates a further embodiment of the invention in which blocks are held at spaced points on pairs of cables or flexible wires which pass continuously through a series of such blocks, the connecting sections being flexible to allow the blocks to move through a right angle bend.

In a still further embodiment illustrated in FIG. 6, there are two wires or cables 180, 182 with spaced blocks 184 at regular intervals thereon. In this case, the blocks 184 are spaced sufficiently apart so that the gear teeth 168a can enter within the space between adjacent blocks and the wire sections 180, 182 between adjacent blocks are sufficiently pliable or bendable so that movement is permitted of the blocks 184 from the horizontal section of the track 86 around the radius section 88 and into the vertical section 90. The fit between blocks 184 and the track 90 is such that sliding movement of blocks 184 is freely permitted but excessive lateral movement is not allowed the blocks which would otherwise cause buckling or bending of sections 180, 182. Hence, the wire or cable sections 180, 182 have substantial compressive strength and can support the top 22 and effect raising and lowering movement of the top, but the blocks and cable form a chain which is nevertheless fully flexible throughout its length to round the right angle bend between the vertical and horizontal sections.

Referring next to the embodiments of FIG. 9, a plurality of loosely fitted balls 200 are received on a cable or wire section 202, each ball having a central passage 204 which permits it to be moved in the direction of the arrow 206. The balls are advanced by means of a rotatable gear wheel 210 having radially extending arms 212 which are proportioned so that as the balls are gravity advanced, the next succeeding ball will be picked up by the adjacent arm, thus providing a continuous contact between one of the arms 212 and an oncoming ball which is gravity fed from vertical section 214. There are sufficient balls advancing from storage so that balls can be advanced through the track and communicate lifting force to the necessary distance whereby the top is raised to its full upward position. The top is gear locked just as in the previous embodiments and the weight of the top is sufficient so that when the gear movement is reversed, the balls 200 will be brought back and moved vertically upward to stored position, moving oppositely to the arrow 206 in FIG. 9.

OPERATION

In operation, when it is desired to raise the top 22, the crank 50 is rotated, thereby operating the gears 54 and 62 and causing turning of the sprockets 58, 60 interconnected sprockets 74, 76, 78 and 80. The extension rod 64 causes the simultaneous operation of the same gear and sprocket arrangement at the rear of the vehicle as indicated in FIG. 7. The gears 82 extending into the slots 84 engage successive ones of the plastic blocks 94, advancing them through the horizontal track section and radiused section 88 and moving them upwardly within the vertical track section 90 where the telescopic members 28, 30, 32 are extended, thereby raising the top 22. Telescopic members are associated one with each of the corners of the top 22 to cause the top to raise evenly and squarely at the respective corners. When the top is fully raised, the gears are sufficient to lock the top in place; i.e., the weight at the top is insufficient to cause reverse gear movement.

When it is desired to lower the top 22, the crank 50 is counterrotated, displacing the plastic blocks 94 in an opposite direction and the plastic blocks 94 move downwardly within channel 90 causing the telescopic members 28, 30, 32 to contract and lowering the top 22. The articulated plastic blocks 94 are displaced within the horizontal track into the storage sections (indicated in FIG. 3) as the vertically overlapped sections). The blocks 94 continue to be displaced until the top 22 is fully lowered. It does not take considerable manual effort to effect raising and lowering of the top 22, and there is little opportunity for jamming or misplacement of the plastic blocks 94 since they are confined at all times within either the horizontal or vertical sections of the track or are rounding the right angle turn 88 which interconnect the vertical 90 and horizontal sections 86 of the track.

Figure 5:
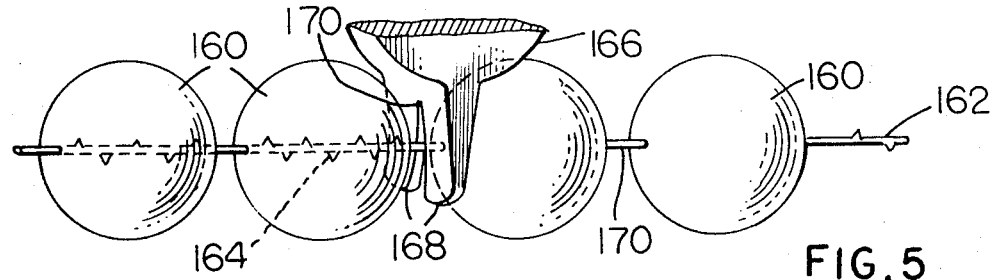
FIG. 5 illustrates a further embodiment of the mechanical raising and lowering elements in which, in place of the articulated blocks, are a plurality of spherical balls which are gripped at spaced points on a flexible cable, the balls being displaced by fingers of a gear which straddle the connecting section between adjacent balls.

In the other embodiments, indicated in FIGS. 5, 6 and 9, mechanical raising and lowering efforts of a crank 50 are used in the same manner as previously described, except that in the case of FIG. 5 the gear wheel 166 has projections 168 which displace balls 160 mounted on a wire or cable 162, either advancing or withdrawing the line of plastic balls within the track and thereby extending or contracting the telescopic members 28, 30, 32 for the raising and lowering movements of the top 22.

Likewise, the plastic blocks 184 which are fixed on a pair of spaced cables or wires 180, 182, are adapted for the same result as indicated for the balls 160.

In the case of the embodiment of FIG. 9, the balls 200 are loosely mounted on the cable and are in end-to-end contact to produce the raising and lowering movements in accordance with the displacement effected by gear 210.

CONCLUSION

While the present invention has been illustrated and described in connection with a few selected example embodiments, it will be understood that these are illustrative of the invention and are by no means restrictive thereof. It is reasonably to be expected that those skilled in this art can make numerous revisions and adaptations, and it is intended that such revisions and adaptations will be included within the scope of the following claims as equivalents of the invention.

What is claimed is:

1. In a convertible trailer having a frame, a body, and a raisable and lowerable top which moves vertically relatively to said body, the raising and lowering mechanism comprising: telescoping members which are generally nonvertically supportive and secured to said body and top respectively to provide the raising and lowering movements of said top, guidetrack means having horizontal, radiused and vertical sections associated with said telescoping members, a plurality of articulated linkage elements received in said tracks and movable through the horizontal radiused and vertical sections respectively to communicate raising and lowering movements of said top by serial force transmission through said elements, and to provide vertical supportive load for said top in the vertical position obtained within said telescoping members, said elements being externally confined by a containment within said telescoping members whch preclude buckling in the vertical supportive position of said elements, and manually operable drive means for effecting display articulated elements within said track.

2. The claimed structure in accordance with claim 1 wherein said articulated elements comprises a plurality of individual plastic composition blocks, each having a wrist pin connection with its adjacent member, and means forming a driving connection between said actuating means and respective one of said members whereby driving force is communicated in series between said elements.

3. The claimed structure in accordance with claim 1 wherein said elements consist of a plurality of regularly spaced apart blocks having flexible connecting means and extending continuously through said track, whereby said blocks can move between horizontal and vertical sections of said track and communicate raising and lowering forces therebetween.

4. The claimed construction in accordance with claim 1 wherein horizontal track sections are overlapped and the driving elements include a retracting section with a reserve of lifting elements therein sufficient to effect movement of the top from a fully lowered to a fully raised position.

5. The claimed construction in accordance with claim 1 including a plurality of spherical, regularly spaced elements, a relatively flexible cable having said spherical elements in permanent fixed positions thereon, said cable providing sufficient bending movement between adjacent elements to provide travel of said elements through the radius connecting the horizontal and vertical track sections respectively, and means for actuating said elements including a rotary member having fingers which straddle the flexible cable and pass between adjacent spherical members, and engageable therewith to effect their displacement in vertical and horizontal directions and communicate a longitudinal chain of force effective for raising and lowering movements of the top which is connected to said elements.

6. The claimed structure in accordance with claim 1 including a rotating handle, a drive shaft, spaced gearing means, having drive elements associated with spaced-apart pairs of said guide means, and means for connecing said gears to the lift elements in said respective pairs of guide whereby actuation of said crank simultaneously communicates lifting force at spaced points of said top.

* * * * *